United States Patent [19]
Zhao

[11] Patent Number: 5,889,528
[45] Date of Patent: Mar. 30, 1999

[54] MANIPULATION OF BRANCHING GRAPHIC STRUCTURES USING INVERSE KINEMATICS

[75] Inventor: Jianmin Zhao, Issaquah, Wash.

[73] Assignee: Silicon Graphics, Inc., Mountain View, Calif.

[21] Appl. No.: 690,115

[22] Filed: Jul. 31, 1996

[51] Int. Cl.$^6$ .................................................. G06T 3/00
[52] U.S. Cl. ...................... 345/436; 345/433; 345/437; 345/438; 345/440
[58] Field of Search ................................ 395/133–139; 345/433–439, 440

[56] References Cited

U.S. PATENT DOCUMENTS 5,579,444   11/1996   Dalziel et al. .............................. 395/94

OTHER PUBLICATIONS

Press, William H., et al., *Numerical Recipes in C: The Art of Scientific Computing*, (Second Edition)(1995), pp. 425–430.
Asaithambi, N.S., *Numerical Analysis: Theory and Practice*, (1995), pp. 295–302.

Zhao, et al., *Inverse Kinematics Positioning Using Nonlinear Programming for Highly Articulated Figures*, ACM Transactions on Graphics, vol. 13, No. 4, Oct. 1994, pp. 314–336.

Press, William H., et al., *Numerical Recipes in C: The Art of Scientific Computing*, (Second Edition)(1995), pp. 683–688.

*Primary Examiner*—Almis R. Jankus
*Attorney, Agent, or Firm*—Fish & Richardson P.C.

[57] ABSTRACT

A graphic structure having a root block with a root, and at least two branch blocks each with an end effector, is manipulated from an initial configuration towards a goal configuration. The manipulation derives, in a succession of iterations, an update configuration positioning the end effectors closer to corresponding goal positions than in a prior configuration, and in one iteration, derives an update configuration by reducing the effect of a root block on an end effector of a branch block.

22 Claims, 4 Drawing Sheets

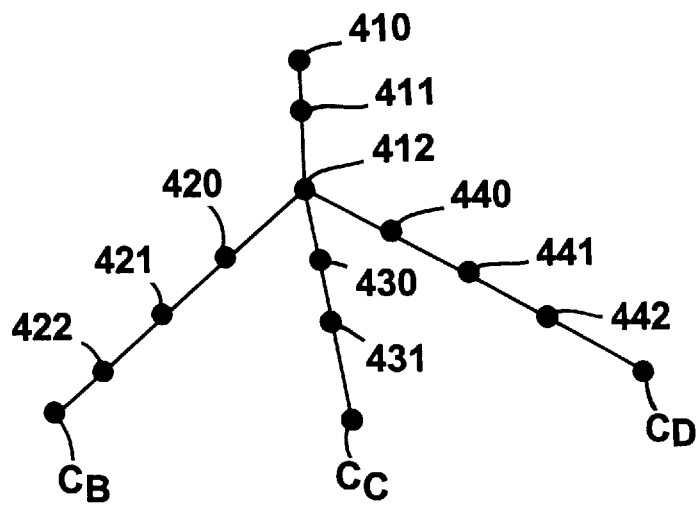
FIG. 4
FIG. 5
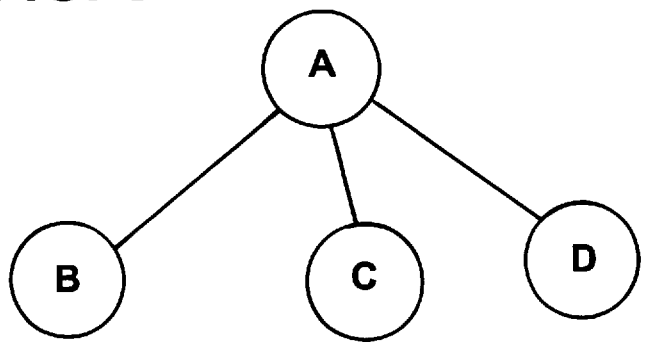

MANIPULATION OF BRANCHING GRAPHIC STRUCTURES USING INVERSE KINEMATICS

BACKGROUND

This invention relates to manipulation of graphic structures.

FIGS. 1a and 1b illustrate examples of graphic structures. Kinematics is an approach to structure manipulation, construing a structure (or a portion of a structure) as having a recursive branching arrangement, beginning with a root joint 110a and 110b branching off to zero or more joints 111a and 111b each of which, in turn, may branch off to zero or more joints 112a, 120b, 130b, and 160b and so on, with each branch eventually terminating in an end effector 114a, 122b, 141b, 151b, and 162b.

Graphic structures are used in fields such as computer animation. For example, FIG. 2 shows a graphic structure 200 representing the upper body of a human, with a root joint representing the torso 210, joints representing the shoulders 220 and 230, elbows 221 and 231, and wrists 222 and 232, and end effectors representing the hands 223 and 233.

Forward kinematics addresses the problem: "Assuming a stationary root joint and given specific joint angles at the structure's joints, find the position of the end effectors." Using the upper body example 200, kinematics determines the positions of the hands 223 and 233, given the position of the torso 210 and the angles at the shoulders 220 and 230, elbows 221 and 231, and wrists 222 and 232. Only one configuration of the structure satisfies these conditions, and is readily determined by starting at the root joint 210 and positioning the joints 220, 221, 222, 230, 231, and 232 based on the given joint angles until the positions of the end effectors 223 and 233 are determined.

Inverse kinematics addresses the reverse problem: "Assuming a stationary root joint and given specific goal positions for the structure's end effectors, find the configuration of the structure that positions the end effectors at the goal positions." Again using the upper body example 200, inverse kinematics determines angles at the shoulders 220 and 230, elbows 221 and 231, and wrists 222 and 232 to place the hands 223 and 233 at specified goal positions.

Unlike forward kinematics, inverse kinematics addresses a problem that may have multiple solutions, as multiple sets of joint angles may satisfy the placement requirement of the end effectors.

SUMMARY

In general, in one aspect, the invention features a computer-implemented method of manipulating a graphic structure from an initial configuration towards a goal configuration, the graphic structure comprising a root block having a root, and at least two branch blocks each having an end effector.

The method derives, in a succession of iterations, an update configuration positioning the end effectors closer to corresponding goal positions than in a prior configuration, and in one iteration, derives an update configuration by reducing the effect of the root block on an end effector of a branch block.

Certain implementations of the invention may include one or more of the following features.

The method assigns the updated configuration as the goal configuration if the updated configuration satisfies a termination criterion. For example, termination criterion is satisfied if an error value determined for the updated configuration reflecting the difference between the updated configuration and the goal configuration indicates that the difference is less than a threshold error value. Termination criterion may also be satisfied if the error value of the updated configuration indicates that the difference is the minimum possible difference.

The iteration that derives the update configuration by reducing the effect of the root block on an end effector of a branch block is the first iteration.

In general, in another aspect, the invention enables use of the computer-implemented method through a memory device storing computer-readable instructions for aiding the computer to manipulate the graphic structure.

By taking advantage of the independence of the end effectors of branching graphic structures, the invention provides an iterative method for manipulating a graphic structure that converges quickly to find a goal configuration.

Other features and advantages of the invention will become apparent from the following description and from the claims.

BRIEF DESCRIPTION OF THE DRAWINGS

FIG. 4 illustrates a graphic structure.

FIG. 5 illustrates a block representation of a graphic structure.

DESCRIPTION

Figure 2:
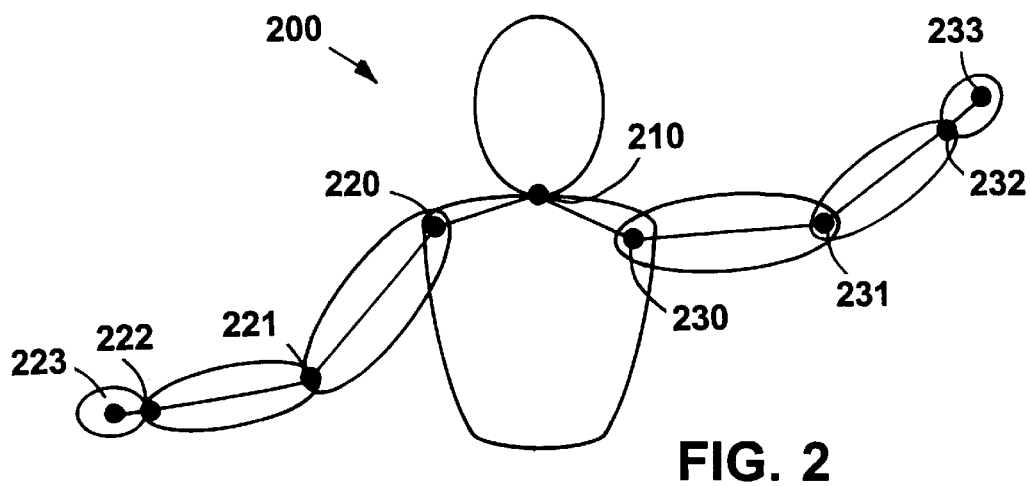

The invention addresses manipulation of a graphic structure (or a portion of a graphic structure) having at least two dimensions, such as the structure 200 illustrated in FIG. 2.

Figure 1A:
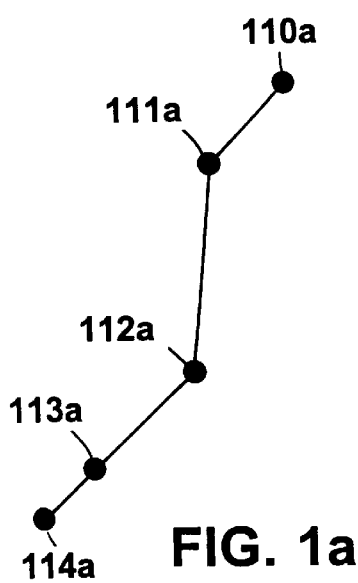
FIGS. 1a, 1b, and 2 illustrate graphic structures.

Graphic structures may be non-branching or branching. In a non-branching structure such as that illustrated in FIG. 1a, each node (which may be a root joint, a joint, or an end effector) has at most one child node. In animation, for example, a non-branching structure may be used to represent one of the arms in the torso 200 illustrated in FIG. 2, with a root joint 210 representing the torso, joints representing the shoulder 220, elbow 221, and wrist 222, and an end effector representing the hand 223.

Figure 1B:
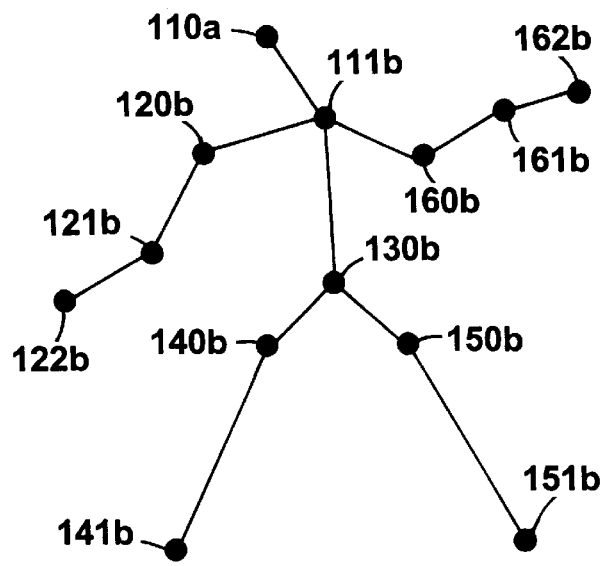

An example of a branching structure is illustrated in FIG. 1b. In contrast to a non-branching structure, a node 111b in a branching structure may have more than one child 120b, 130b, 160b. A branching structure may be used, for example, to represent the upper body 200 in FIG. 2, in which root joint 210 branches to two child joints 220, 230.

A branching structure thus has a root joint, a set of connected joints, and a set of e end effectors. A configuration describes a specific position of the structure, and assuming a stationary root joint, may be defined by a set of n joint angles describing angles at each of the joints. For a configuration $\theta_k$ of the structure, let:

$\theta_k$: represent the n joint angles of the structure, $\{\theta_{k1}, \theta_{k2}, \ldots, \theta_{kn}\}$;

$e_k$: represent the multi-dimensional positions of the structure's e end effectors $\{e_{k1}, e_{k2}, \ldots, e_{ke}\}$;

g: represent the multi-dimensional positions of a set of e goal positions corresponding to the e end effectors $\{g_1, g_2, \ldots, g_e\}$;

f($e_{ki}$, $g_i$): represent a function for determining a distance between the current position of end effector $e_{ki}$ and its corresponding goal position $g_i$; and F($e_k$): represent an error function based on the distance functions f($e_{ki}$, $g_i$). In one embodiment, F($e_k$) is $\Sigma$ f$^2$($e_{ki}$, $g_i$) as i ranges from 1 to e.

Each configuration $\theta_k$ corresponds to a set of end effector positions $e_k$, which in turn corresponds to an error value determined for error function F($e_k$). A configuration $\theta_k$ comprising the set of n joint angles $\{\theta_{k1}, \theta_{k2}, \ldots, \theta_{kn}\}$ may be viewed as a point in an n-dimensional angle space defined by the n joint angles of the structure, where each point in the angle space maps to an error value for the configuration end effectors corresponding to that point, with respect to a set of goal positions g. The goal configuration $\theta_g$ is the configuration corresponding to the point mapping to a minimal error value.

The invention manipulates a branching structure from an initial configuration $\theta_o$ towards a goal configuration $\theta_g$, ultimately positioning the multiple end effectors e of the structure at or near the desired goal positions g. The goal configuration $\theta_g$ is determined using a numerical iteration technique that iteratively updates an approximation $\theta_k$ to a next approximation $\theta_{k+1}$ converging towards the goal configuration $\theta_g$.

Figure 3:
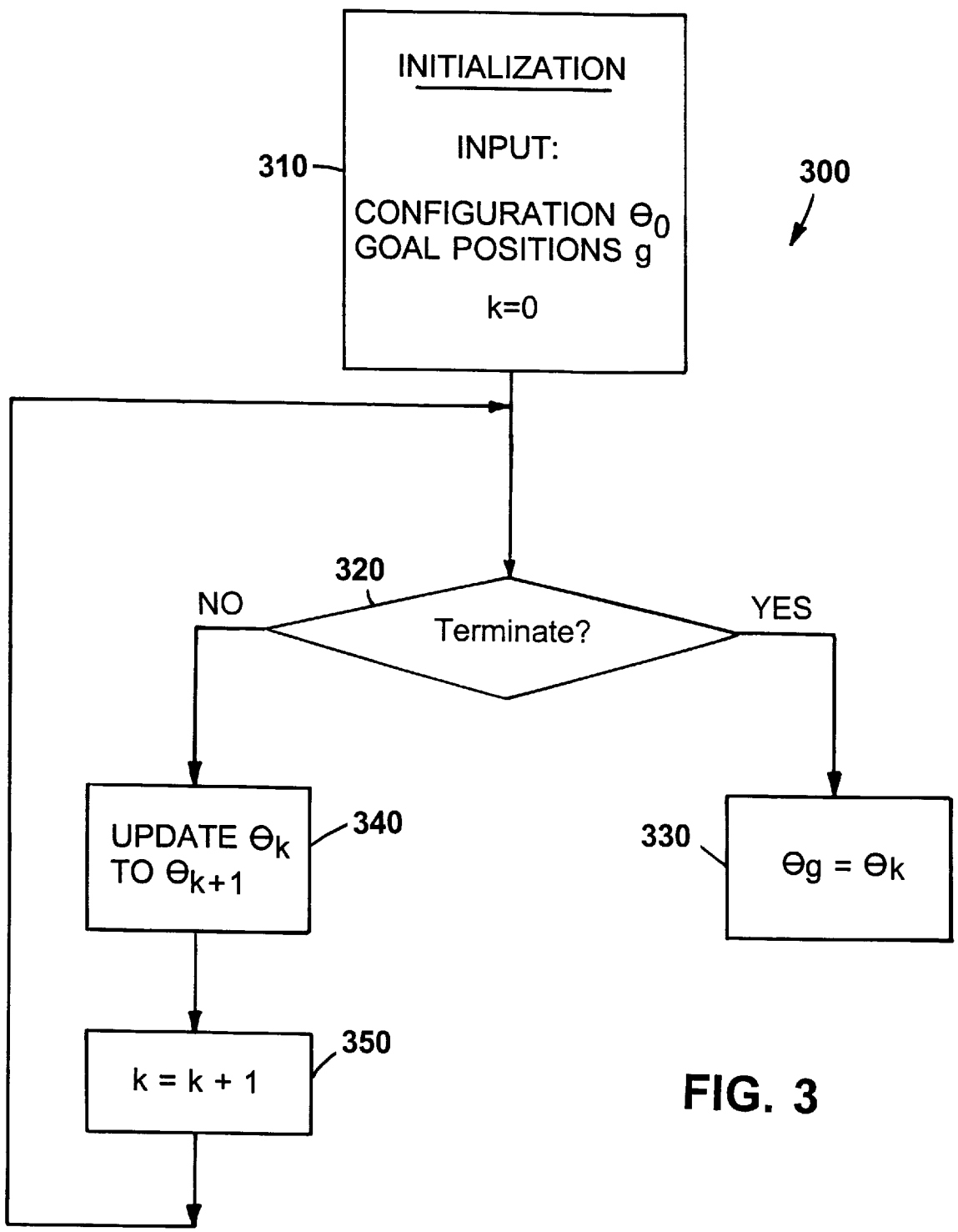
FIG. 3 is a flow diagram of a method of manipulating a graphic structure.

Referring to the flow diagram 300 of FIG. 3, the method for manipulating a graphic structure towards a goal configuration $\theta_g$ positioning its end effectors e at or near goal positions g begins with an initial approximation $\theta_o$, which may be determined by any reasonable method (310). For example, initial configuration $\theta_o$ may be the previously determined configuration for the graphic structure.

In FIG. 3, k is used as a counter for the number of iterations performed. Initially, k is set to 0 (310), and $\theta_k$ represents the configuration of the current iteration for finding $\theta_g$.

At each iteration, the invention determines whether to terminate (320). Termination criteria may vary. For example, if the end effectors of $\theta_k$ are determined to be positioned within a threshold distance from goal positions g or if the end effectors are determined to be as close as possible to the goal positions, the goal configuration $\theta_g$ is set to $\theta_k$ (330), and the iterative process terminates.

Other termination criteria are possible. For example, possible methods may limit the number of iterations k or the processing time allowed for the iterative process.

If the termination criteria are not met, $\theta_k$ is updated to a next approximation $\theta_{k+1}$ (340). k is incremented (350), indicating that another iteration is to be performed, and the iterative cycle repeats (320).

The practical success of an iterative technique depends in part on reducing the number of iterations required to find $\theta_g$, which in turn depends on the update method used at 340. The faster the update method converges towards the goal configuration, the fewer iterations will be required.

Viewing a configuration as a point in the n-dimensional angle space, configuration $\theta_k$ is updated to a configuration $\theta_{k+1}$ that is closer to $\theta_g$, by searching for an n-dimensional direction $\Delta\theta_k$ from the point representing $\theta_k$ towards a point that will bring the end effectors closer to the corresponding goal positions.

This search for the direction $\Delta\theta_k$ towards $\theta_g$ is not easily performed because $\theta_g$ is unknown: only g is known, and many configurations of the structure may correspond to a lower error value for F(e) with respect to g.

The quasi-Newton minimization method simplifies the search by locally approximating the composite function from a configuration $\theta_k$ to error value F($e_k$) with a quadratic function at the specific point representing configuration $\theta_k$ in the n-dimensional angle space. The direction from the point $\theta_k$ towards $\theta_g$ can be determined by:

$$\Delta\theta = -H_\theta(F)^{-1}\nabla_\theta(F) \quad [\text{EQ 1}]$$

References such as WILLIAM H. PRESS, et al., NUMERICAL RECIPES in C: THE ART of SCIENTIFIC COMPUTING 425–430 (1995), incorporated by reference, discuss the quasi-Newton method in greater detail.

EQ 1 indicates that finding a direction $\Delta\theta_k$ from a configuration $\theta_k$ requires calculation of the inverse of the Hessian $H_\theta(F)$ of error function F with respect to $\theta$ (calculated by taking the second partial derivative of F with respect to $\theta$), as well as the gradient of the error function F with respect to $\theta$.

Approximation $\theta_k$ is updated by moving in the direction $\Delta\theta_k$ determined by EQ 1 to a next approximation $\theta_{k+1}$:

$$\theta_{k+1} = \theta_k + \alpha_k \Delta\theta_k$$

where $\alpha_k$ may be determined through standard numerical iteration techniques such as those described in N.S. ASAITHAMBI, NUMERICAL ANALYSIS: THEORY AND PRACTICE, 295–302 (1995), incorporated by reference.

Direction $\Delta\theta_k$ is calculated to determine the direction from approximation $\theta_k$ towards $\theta_g$, and is recalculated for each iteration. While determination of the gradient is a straight-forward calculation, determination of the inverse of the Hessian can be computationally complex, generally of order $O(n^3)$. Furthermore, because the negative of the gradient direction is guaranteed to be in a descending direction, it is desirable to require the Hessian to be positive-definite in order to maintain this property in the calculated value for $\Delta\theta_k$. To avoid direct recalculation of the Hessian at each iteration and to preserve the positive-definite property in subsequent iterations, the BFGS variable metric method approximates an updated inverse Hessian $\overline{H}_\theta$ by using the following formula:

$$\overline{H}_{\theta,k+1} = \overline{H}_{\theta,k} + \left(1 + \frac{\gamma^T \overline{H}_{\theta,k} \gamma}{\delta^T \gamma}\right)\frac{\delta^T \delta}{\delta^T \gamma} - \left(\frac{\delta\gamma^T \overline{H}_{\theta,k} + \overline{H}_{\theta,k}\gamma\delta^T}{\delta^T \gamma}\right) \quad [\text{EQ 2}]$$

where:

$$\delta = \theta_{k+1} - \theta_k$$

$$\gamma = \nabla_\theta F(e_{k+1}) - \nabla_\theta F(e_k)$$

For more information about the BFGS method, developed by Broyden, Fletcher, Goldfarb, and Shanno, see Jianmin Zhao and Norman I. Badler, Inverse Kinematics Positioning Using Nonlinear Programming for Highly Articulated Figures, 13 ACM TRANSACTIONS on GRAPHICS 313, 332–36 (1994), incorporated by reference, which also makes further reference to other related articles.

While the BFGS method provides a successful method of updating the inverse Hessian, it does not address how the initial inverse Hessian matrix is to be found. Possible initial approximations for the inverse Hessian include the identity matrix or an arbitrary positive-definite matrix. However, using a matrix that does not reflect any information regarding the direction from the current configuration $\theta_k$ towards goal configuration $\theta_g$ may converge very slowly towards the goal configuration and thus require a large number of iterations. Accordingly, the invention finds a closer approximation to the inverse of the Hessian to use in the initial iteration, after which the BFGS method may be used.

The Hessian of F with respect to θ reflects the relationship between joint angles of a configuration with the distance between the configuration's end effectors and the desired goal positions. In general, for branching structures such as that illustrated in FIG. 4, the position of each end effector $e_B$, $e_C$, $e_D$ is affected only by the joint angles of the structure between itself and the root joint 410.

In FIG. 5, Block A represents a root block for root joint 410, joints 411, 412 and their corresponding joint angles (referred to as $\theta_A$); Blocks B, C, and D each represent a branch block, with Block B representing joints 420, 421, 422 and end effector $_B$ and their corresponding joint angles (referred to as $_B$); Block C representing joints 430, 431 and end effector $_C$ and their corresponding joint angles (referred to as $\theta_C$); and Block D representing joints 440, 441, 442 and end effector $_D$ and their corresponding joint angles (referred to as $\theta_D$)

Because the function from a configuration $\theta_{ek}$ to an error value for $F(e_k)$ is a composite function requiring an intermediate calculation of the positions of end effectors $_k$ based on configuration $\theta_k$, the Hessian matrix of $F(e_k)$ with respect to $\theta_k$ cannot be directly calculated. One way is to first calculate the gradient of F(e) with respect to θ, and to take the partial derivative of the gradient with respect to θ, applying the chain rule to calculate the Hessian matrix of F(e) with respect to θ.

The gradient of F(e) with respect to θ is:

$$\partial F/\partial\theta = \partial F/\partial e \cdot \partial e/\partial\theta \quad [EQ\ 3]$$

where the gradient of F(e) with respect to e is:

$$\frac{\partial F}{\partial e} = \begin{bmatrix} \frac{\partial f(e_B, g_B)}{\partial e_B} \\ \frac{\partial f(e_C, g_C)}{\partial e_C} \\ \frac{\partial f(e_D, g_D)}{\partial e_D} \end{bmatrix} \quad [EQ\ 4]$$

and the Jacobian of e with respect to θ is:

$$\frac{\partial e}{\partial \theta} = \begin{bmatrix} \frac{\partial e_B}{\partial \theta_A} & \frac{\partial e_C}{\partial \theta_A} & \frac{\partial e_D}{\partial \theta_A} \\ \frac{\partial e_B}{\partial \theta_B} & 0 & 0 \\ 0 & \frac{\partial e_C}{\partial \theta_C} & 0 \\ 0 & 0 & \frac{\partial e_D}{\partial \theta_D} \end{bmatrix} \quad [EQ\ 5]$$

Both the gradient (EQ 4) and Jacobian (EQ 5) are block matrices, and in both, the zeros reflect the branch-wise independence of the structure. For example, the matrix element in the second row and second column of EQ 5 represents the change in the position of $e_C$ with respect to a change in the angles of $\theta_B$. As can be seen in FIGS. 4 and 5, the joint angles 420, 421, 422 of Block B have no effect on the position of $e_C$. Accordingly, the partial derivative of $e_C$ with respect to $\theta_B$ is zero. Analogous arguments explain the other zeros in EQ 4 and EQ 5.

Applying the chain rule, the Hessian of F(e) with respect to θ, referring to EQ 3, is:

$$\frac{\partial^2 F}{\partial\theta\partial\theta} = \frac{\partial}{\partial\theta}\left(\frac{\partial F}{\partial\theta}\right) = \quad [EQ\ 6]$$

$$\frac{\partial^2 F}{\partial e\partial e}\frac{\partial e}{\partial\theta}\frac{\partial e}{\partial\theta} + \frac{\partial F}{\partial e}\frac{\partial^2 e}{\partial\theta\partial\theta}$$

which requires additional calculation of the Hessian of F(e) with respect to e and the second partial derivative of e with respect to θ.

The Hessian of F(e) with respect to e is a diagonal block matrix of dimension e × e, with the e rows and e columns corresponding to the number of end effectors:

$$\frac{\partial^2 F}{\partial e\partial e} = \begin{bmatrix} \frac{\partial^2 f(e_B, g_B)}{\partial e_B \partial e_B} & 0 & 0 \\ 0 & \frac{\partial^2 f(e_C, g_C)}{\partial e_C \partial e_C} & 0 \\ 0 & 0 & \frac{\partial^2 f(e_D, g_D)}{\partial e_D \partial e_D} \end{bmatrix} \quad [EQ\ 7]$$

The zeros in the non-diagonal positions again reflect the branch-wise independence of the structure. For example, with reference to FIGS. 4 and 5, the distance between a position of $e_B$ and a goal position for $e_B$ is independent of the positions of end effectors $e_C$ and $e_D$. Accordingly, the non-diagonal elements in the first column of EQ 7 are zero.

The final matrix needed to calculate the Hessian of EQ 3, is the second partial derivative of e with respect to θ:

$$\frac{\partial^2 e}{\partial\theta\partial\theta} = \begin{bmatrix} \frac{\partial^2 e}{\partial\theta_A\partial\theta_A} & \frac{\partial^2 e}{\partial\theta_A\partial\theta_B} & \frac{\partial^2 e}{\partial\theta_A\partial\theta_C} & \frac{\partial^2 e}{\partial\theta_A\partial\theta_D} \\ \frac{\partial^2 e}{\partial\theta_B\partial\theta_A} & \frac{\partial^2 e}{\partial\theta_B\partial\theta_B} & 0 & 0 \\ \frac{\partial^2 e}{\partial\theta_C\partial\theta_A} & 0 & \frac{\partial^2 e}{\partial\theta_C\partial\theta_C} & 0 \\ \frac{\partial^2 e}{\partial\theta_D\partial\theta_A} & 0 & 0 & \frac{\partial^2 e}{\partial\theta_D\partial\theta_D} \end{bmatrix} \quad [EQ\ 8]$$

Finally, the Hessian of F(e) with respect to θ is calculated from EQS 4, 5, 7, and 8:

$$\frac{\partial^2 F}{\partial\theta\partial\theta} = \begin{bmatrix} \frac{\partial^2 F}{\partial\theta_A\partial\theta_A} & \frac{\partial^2 F}{\partial\theta_A\partial\theta_B} & \frac{\partial^2 F}{\partial\theta_A\partial\theta_C} & \frac{\partial^2 F}{\partial\theta_A\partial\theta_D} \\ \frac{\partial^2 F}{\partial\theta_B\partial\theta_A} & \frac{\partial^2 F}{\partial\theta_B\partial\theta_B} & 0 & 0 \\ \frac{\partial^2 F}{\partial\theta_C\partial\theta_A} & 0 & \frac{\partial^2 F}{\partial\theta_C\partial\theta_C} & 0 \\ \frac{\partial^2 F}{\partial\theta_D\partial\theta_A} & 0 & 0 & \frac{\partial^2 F}{\partial\theta_D\partial\theta_D} \end{bmatrix} \quad [EQ\ 9]$$

Each of the elements of EQ 9 are themselves matrices. For example, for the structures illustrated in FIGS. 4 and 5, F(e) has three components ($f(e_B, g_B)$, $f(e_C, g_C)$, and $f(e_D, g_D)$, where $g_B$, $g_C$, and $g_D$ are goal positions (not shown)), and each $\theta_i$ reflects the number of joint angles in its corresponding Block i. Direct inversion of the Hessian matrix of F(e) with respect to θ is therefore likely to be a prohibitively expensive operation, even if the matrix is positive-definite.

However, matrix inversion is greatly simplified for diagonal matrices. Even for a matrix such as the Hessian matrix in EQ 9 for which each element is itself a matrix, inversion is still much simpler if the only non-zero elements are the diagonal elements, as matrix inversion may be performed by inversion of the individual diagonal elements. Accordingly, to simplify the inversion, the Hessian matrix of EQ 9 is approximated as:

$$\frac{\partial^2 F}{\partial \theta \partial \theta} \approx \begin{bmatrix} \frac{\partial^2 F}{\partial \theta_A \partial \theta_A} & 0 & 0 & 0 \\ 0 & \frac{\partial^2 F}{\partial \theta_B \partial \theta_B} & 0 & 0 \\ 0 & 0 & \frac{\partial^2 F}{\partial \theta_C \partial \theta_C} & 0 \\ 0 & 0 & 0 & \frac{\partial^2 F}{\partial \theta_D \partial \theta_D} \end{bmatrix} \quad [\text{EQ 10}]$$

The Hessian approximation of EQ 10 ignores the nonzero non-diagonal matrix elements which provide information about the effect on the error function F(e) of changes in the angles of the root block (in this case, Block A). Accordingly, the approximation will be closer when the root block has a comparatively insignificant effect (in comparison to the branch blocks) on the positions of the end effectors of the structure.

EQ 10 is an approximation of the Hessian, and is inverted before being used in EQ 1. As discussed, it is desirable to ensure that the Hessian approximation is positive-definite. Accordingly, an additional operation may be performed to ensure that the matrix determined by EQ 10 is positive-definite. Because EQ 10 is a diagonal matrix and each of the elements on its diagonal is itself a matrix, the matrix of EQ 10 is positive-definite if each of its diagonal elements is also positive-definite.

A variety of methods may be used to ensure positive-definiteness. One possible method adds a Levenberg-Marquardt matrix to each block that is large enough to make each block positive-definite, but small enough to have a minimal effect on the accuracy of the approximation. The Levenberg-Marquardt updated matrix takes the form:

$$\frac{\partial^2 F}{\partial \theta \partial \theta} \approx \begin{bmatrix} \frac{\partial^2 F}{\partial \theta_A \partial \theta_A} + \upsilon_A I & 0 & 0 & 0 \\ 0 & \frac{\partial^2 F}{\partial \theta_B \partial \theta_B} + \upsilon_A I & 0 & 0 \\ 0 & 0 & \frac{\partial^2 F}{\partial \theta_C \partial \theta_C} + \upsilon_A I & 0 \\ 0 & 0 & 0 & \frac{\partial^2 F}{\partial \theta_D \partial \theta_D} + \upsilon_A I \end{bmatrix} \quad [\text{EQ 11}]$$

This method is discussed in greater detail in references such as the previously mentioned WILLIAM H. PRESS, ET AL., NUMERICAL RECIPES in C: THE ART of SCIENTIFIC COMPUTING, at 683–88. In one embodiment, the set of eigenvalues for each of the diagonal matrices in EQ 10 are determined using the following formula:

$$\frac{\gamma_{min} + \upsilon}{\gamma_{max} + \upsilon} = 0.1$$

The matrix determined in EQ 11 is then inverted, and is used as an approximation of the inverse of the Hessian in EQ 1 in the first iteration. Subsequent iterations may use methods such as the BFGS method (EQ 2) to update this approximate matrix to matrices more closely approximating the actual Hessian.

The update is repeated for each iteration until a configuration is found that positions its end effectors sufficiently close, or as near as possible, to the goal positions g. As previously indicated, the determination of when to end the iterative process may vary, and may be based on criteria such as the number of iterations performed or the processing time used. Other possible criteria include a threshold value for the error function F(e). Still another method for determining termination will continue until the direction determined by EQ 1 is 0 or within a threshold amount from 0.

While the invention is described in terms of a software implementation, the invention may be implemented in hardware or software, or a combination of both. Preferably, the invention is implemented in a software program executing on a programmable processing system comprising a processor, a data storage system, an input device, and an output device.

Figure 6:
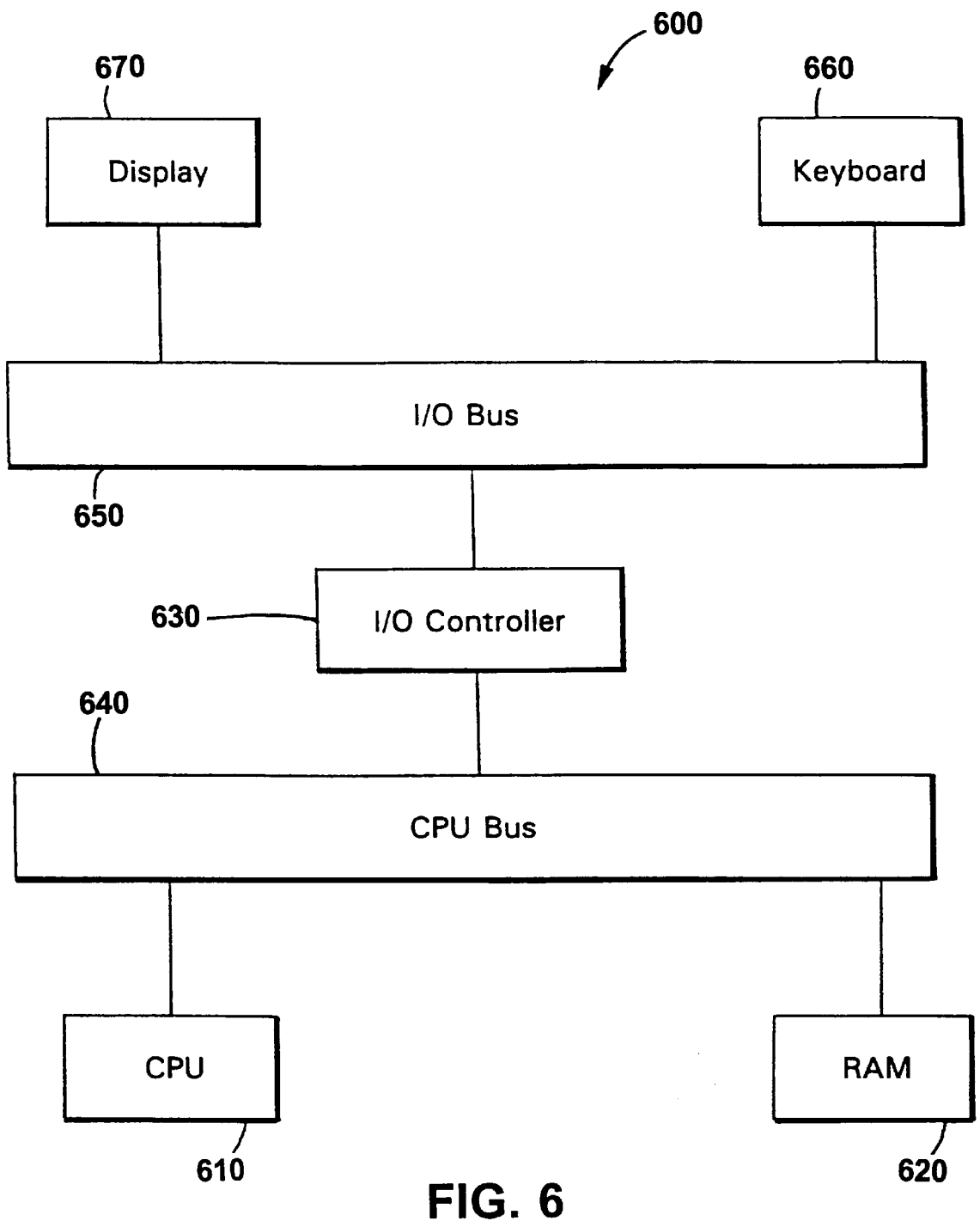
FIG. 6 illustrates a programmable processing system.

FIG. 6 illustrates one such programmable processing system 600, including a CPU 610, a RAM 620, and an I/O controller 630 coupled by a CPU bus 640. The I/O controller 630 is also coupled by an I/O bus 650 to input devices such as a keyboard 660, and output devices such as a display 670.

Other embodiments are within the scope of the following claims.

For example, the manipulation of a branching structure may be customized by enabling a user to weight the distance functions $f(e_n, g_n)$ used in the error function F(e).

Other variations are possible. For example, as previously indicated, a number of methods to determine when to stop the iterative process may be used.

What is claimed is:

1. A computer-implemented method of manipulating a graphic structure from an initial configuration towards a goal configuration, the graphic structure comprising a root block having a root, and at least two branch blocks each having an end effector, the method comprising:

deriving, in a succession of iterations of inverse kinematics computations, an update configuration positioning the end effectors closer to corresponding goal positions than in a prior configuration; and in at least one inverse kinematics computational iteration, deriving an update configuration by reducing a computational effect of the root block on an end effector of a branch block.

2. The method of claim 1 further comprising assigning the updated configuration as the goal configuration if the updated configuration satisfies a termination criterion.

3. The method of claim 2 further comprising determining an error value for the updated configuration reflecting the difference between the updated configuration and the goal configuration, wherein the termination criterion is met if the error value of the updated configuration indicates that the difference is less than a threshold error value.

4. The method of claim 2 further comprising determining an error value for the updated configuration reflecting the difference between the updated configuration and the goal configuration, wherein the termination criterion is met if the error value of the updated configuration indicates that the difference is the minimum possible difference.

5. The method of claim 1, wherein the first inverse kinematics computational iteration derives the update configuration by reducing the computational effect of the root block on an end effector of a branch block.

6. The method of claim 1 wherein the root block and the branch blocks each comprises one or more non-branching joints.

7. The method of claim 1 wherein the graphic structure comprises a recursive branching structure having at least one additional branch block that branches from one of the other branch blocks.

8. The method of claim 7 further comprising deriving, in at least one inverse kinematics computational iteration, an update configuration for the at least one additional branch block by reducing a computational effect of an immediately preceding branch block on the at least one additional branch block.

9. A memory device storing computer-readable instructions for aiding a computer to manipulate a graphic structure from an initial configuration towards a goal configuration, the graphic structure comprising a root block having a root, and at least two branch blocks each having an end effector, the instructions comprising:

instructions for deriving, in a succession of iterations of inverse kinematics computations, an update configuration positioning the end effectors closer to corresponding goal positions than in a prior configuration; and instructions for deriving, in at least one inverse kinematics computational iteration, an update configuration by reducing a computational effect of a root block on an end effector of a branch block.

10. The memory device of claim 9 further comprising instructions for assigning the updated configuration as the goal configuration if the updated configuration satisfies a termination criterion.

11. The memory device of claim 10 further comprising instructions for determining an error value for the updated configuration reflecting the difference between the updated configuration and the goal configuration, wherein the termination criterion is met if the error value of the updated configuration indicates that the difference is less than a threshold error value.

12. The memory device of claim 10 further comprising instructions for determining an error value for the updated configuration reflecting the difference between the updated configuration and the goal configuration, wherein the termination criterion is met if the error value of the updated configuration indicates that the difference is the minimum possible difference.

13. The memory device of claim 9, further comprising instructions for deriving, in the first inverse kinematics computational iteration, the update configuration by reducing the computational effect of a root block on an end effector of a branch block.

14. The memory device of claim 9 wherein the root block and the branch blocks each comprises one or more non-branching joints.

15. The memory device of claim 9 wherein the graphic structure comprises a recursive branching structure having at least one additional branch block that branches from one of the other branch blocks.

16. The memory device of claim 15 further comprising instructions to derive, in at least one inverse kinematics computational iteration, an update configuration for the at least one additional branch block by reducing a computational effect of an immediately preceding branch block on the at least one additional branch block.

17. A computer-implemented method of using inverse kinematics computations to manipulate a graphic structure from an initial configuration towards a coal configuration, the graphic structure comprising a root block having a root, and at least two branch blocks, the method comprising:

deriving an approximation of the goal position by reducing a computational effect of the root block on a branch block, wherein the graphic structure comprises a recursive branching structure having at least one additional branch block that branches from one of the other branch blocks; and deriving, in at least one inverse kinematics computational iteration, an update configuration for the at least one additional branch block by reducing a computational effect of an immediately preceding branch block on the at least one additional branch block.

18. The method of claim 17 further comprising, in a subsequent inverse kinematics computation, adjusting the approximation of the goal position by using the computational effect of the root block on the branch block.

19. The method of claim 18 further comprising repeating the adjustment until the goal configuration is achieved.

20. The method of claim 17 wherein reducing the computational effect of the root block comprises zeroing non-diagonal terms in a computational matrix.

21. The method of claim 17 wherein the root block and the branch blocks each comprises one or more non-branching joints.

22. The method of claim 17 wherein at least one of the branch blocks comprises an end effector.

* * * * *